INVENTOR.
WILLIAM H. DuBOIS
BY
ATTORNEY

INVENTOR.
WILLIAM H. DuBOIS
BY
ATTORNEY

United States Patent Office 2,731,312
Patented Jan. 17, 1956

2,731,312

BRAKE ASSEMBLY

William H. Du Bois, South Bend, Ind., assignor to Bendix Aviation Corporation, South Bend, Ind., a corporation of Delaware Application November 1, 1950, Serial No. 193,455

5 Claims. (Cl. 309—3)

The present invention relates to brakes and more particularly to aircraft brakes of the disc type. The method for making the present invention is covered by my copending application Serial No. 525,749, filed August 1, 1955.

The conventional disc brake hydraulic motor or actuator comprises a metal carrier which has machined therein a piston chamber or bore which may assume any regular or irregular shape as for instance that of an incomplete annulus, a complete annulus, a cylinder, or some odd shape such as that of a "heart" or "kidney." In producing these various chambers, it has been necessary to machine the side walls with suitable tools to obtain the desired shape and size, and degree of wall smoothness. For a chamber shape of an incomplete annulus, the machining operation is tedious and expensive. It is, therefore, an important object of this invention to provide a hydraulic brake actuator in which it is not necessary to machine the piston chamber. It is a further object to provide a method for producing this actuator.

In accomplishing the product of the present invention, a rough casting is first made and has formed therein an oversized piston chamber hereinafter characterized as a cavity. Certain of the outer fastening or joining surfaces of the casting are then machined, after which a mold insert having the shape and size of the actuator piston is inserted into the cavity. Next, either a thermosetting or a thermo-plastic material is injected into the spaces between the insert and the cavity walls, whereby a lining is effectively molded to the walls of the cavity. After the injected material sets, the insert is withdrawn leaving a piston chamber which is ready, without any machining, to reciprocably receive a piston. Thus, it is seen that a hydraulic brake actuator may be produced without following conventional machining steps. The lining for the cavity is held in place by virtue of the rough cavity surfaces resulting from the casting operation. However, by forming the cavity and liner in a certain manner as will heinafter be described, no holding means is necessary for keeping the liner in place, and it is, therefore, another object of this invention to provide a novel construction for retaining a plastic lining in a piston cavity.

The embodiment of the present invention herein disclosed is quite similar to that of DuBois application Serial No. 150,177 filed March 17, 1950.

Figures 2, 3:
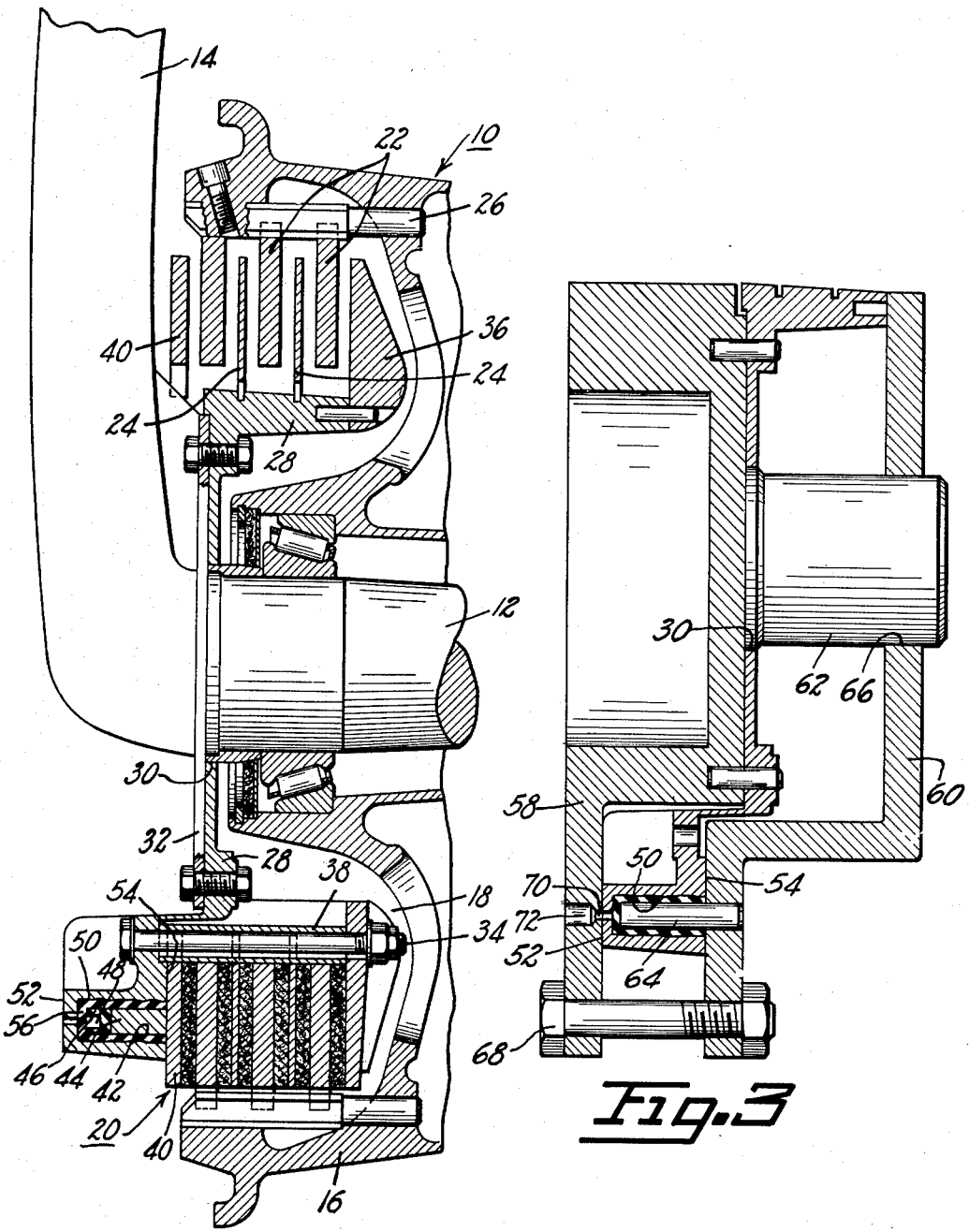
Figure 2 is an axial section taken substantially on section line 2—2 of Figure 1.
Figure 3 is a sectional illustration of a device used in fabricating the hydraulic actuator used in Figures 1 and 2.

Referring to the drawings, and more particularly to Figure 2, a wheel and brake assembly 10 is shown as being supported by an axle 12 projecting laterally from the lower extremity of strut 14. The wheel 16 is provided with a brake cavity 18 which receives a disc brake generally indicated by reference numeral 20. This brake 20 is composed of a plurality of interleaved rotatable and non-rotatable friction discs or members 22 and 24, respectively. Rotatable discs 22 are rotatable with wheel 16 and are axially movable with respect to the latter by means of a plurality of axially extending, circumferentially spaced driving keys 26 which are suitably secured near the outer periphery of brake cavity 18.

A carrier or supporting member 28, which serves as the torque-taking member of the brake, is provided with a central opening 30 which receives the axle 12. A reinforcing flange 32 on the axle 12 provides a convenient attaching means for securing carrier 28 in place. A plurality of axially extending, circumferentially spaced bolts 34 are secured near the outer periphery of carrier 28, and rigidly support a backing plate or reaction member 36 adjacent one end of the stack of friction discs 22 and 24. A plurality of sleeve type keys 38 are received on bolts 34, and are adapted to be slidingly engaged by notches formed in non-rotatable discs 24 whereby said discs 24 are held against rotation but permitted to move axially. A pressure plate 40 is also keyed to keys 38 and is located at the end of the friction disc 22, 24 stack opposite backing member 36. As is illustrated in Figure 2, the discs 22 and 24 may be compressed into frictional engagement by forcing pressure plate 40 toward the backing plate 36.

Figure 1:
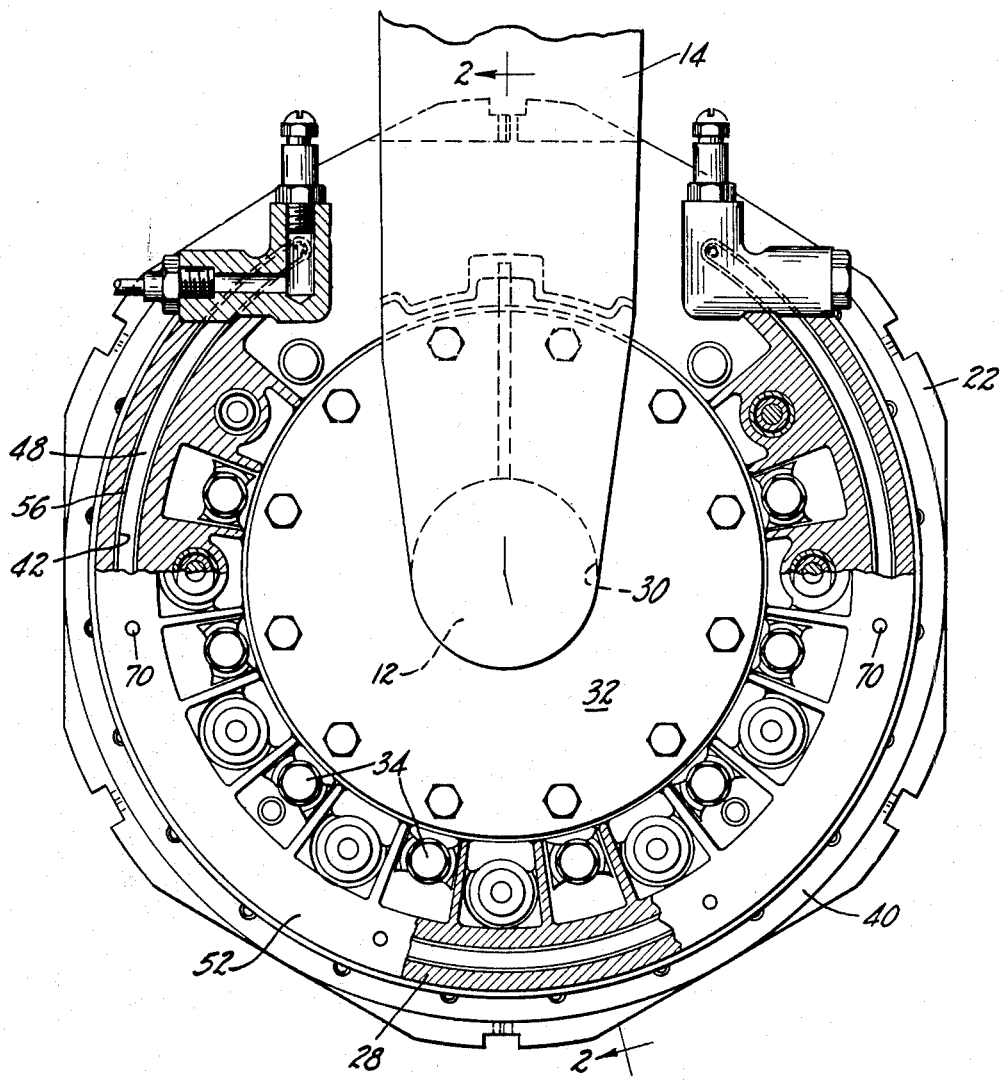
Figure 1 is a side elevation of an embodiment of the present invention with certain parts thereof being shown in section.

Referring now to Figures 1 to 3, the carrier 28 is provided with a piston chamber 42 which reciprocably receives a piston 44. This piston 44 is arranged to act on pressure plate 40, and is provided on its head end with a rubber or the like seal 46. The chamber 48 ahead of the seal 46 is connected by a suitable means to a controllable source of pressure fluid which, through the intermediary of chamber 48, forces piston 44 outwardly against pressure plate 40.

As is noted in the sectional views, the piston chamber 42 is defined by different material than that of carrier 28. Actually, it is preferred to cast the carrier 28, in the conventional manner, of a suitable metal, the cast form of the carrier providing an oversized piston cavity 50 which is defined by opposite rough cast walls and a bottom.

The present invention is particularly useful in connection with hydraulic actuator constructions, such as the one herein disclosed, which has the shape of an incomplete annulus. More will be said later regarding the particular value of the present invention as embodied in this actuator construction, but it is sufficient to recognize at this point that the general shape of the cavity 50 is that of an incomplete annulus.

The rough casting of carrier 28 is machined to provide smooth, substantially parallel surfaces 52 and 54, and the pilot hole 30 is also reamed or broached for a purpose to be explained hereafter. The piston chamber 42 is defined by a liner 56 preferably formed of a thermoplastic or thermosetting material molded into the rough cavity 50. It will be obvious that the rough, unfinished surfaces of cavity 50 serve the useful purpose of providing irregularities for securing the liner 56 in place inasmuch as the contiguous portions of liner 56 intimately follow the irregularities to become in effect keyed thereto. Actually, if desired, small variations or irregularities may be cut or scratched in cavity 50 for this same purpose, it being obvious that it is the roughened surfaces which perform the function of securing the liner 56 in place.

One principal objection in producing all-metal carriers with piston-receiving bores is the cost involved in machining the interiors of the chambers to the desired sizes, shapes, and degrees of smoothness. By lining the walls of a cast cavity with a plastic material of either the thermoplastic or thermosetting type, this costly machining is eliminated, and a piston chamber of the proper size and shape is produced by essentially only two simple operations—casting the rough carrier 28 and molding a liner 56 in position.

Referring to Figure 1 of the drawings, it is seen that the hydraulic actuator is less than a complete annulus. While it is particularly advantageous to utilize the present invention in forming such an actuator, it is to be understood that the basic principles of this invention may be utilized to fabricate other actuators.

The conventional method of forming an incomplete annular chamber is to mill the sides thereof by carefully and tediously following the desired contour. This milling is obviously time consuming and costly, therefore not conducive to economical production. By molding a liner in place, as heretofore explained, the economy and quantity of production may be stepped up considerably.

In forming the liner 56, a mold is used which comprises essentially a platen 58 and a mold clamp 60. The platen 58 carries a pilot stub 62 which is snugly received in carrier opening 30, and clamp 60 has extending therefrom a mold insert 64 having a size and shape of the piston normally received in chamber 42. The platen 58 is fitted as shown against carrier surface 52, and clamp 60 is centered with respect to the platen 58 and also carrier 28 by means of an opening 66 which receives stub 62. The mold insert 64 is thereby positioned within rough cavity 48 leaving side and bottom spaces to be occupied by the liner. The platen 58 and clamp 60 are clamped together by a suitable means such as the nut and bolt combination 68. Preferably, molten or fluid plastic material is injected into the liner spaces and allowed to set whereby the mold insert may be removed leaving a piston chamber 42 which is ready to receive a piston. Figure 3 illustrates one method for injecting the fluid plastic, which is to force the plastic through multiple perforations 70 in the carrier 28 which connect the liner spaces with passages 72 in platen 58. With certain types of lining material, it is necessary to heat the molding fixture to a predetermined temperature before performing the molding operation in order to achieve the desired intimate fit between linear and cavity.

The brake assembly operates by introducing liquid under pressure into chamber 48, which forces piston 44 outwardly to compress the friction discs 22 and 24 against backing plate 36. It will be noted that during this action, the liquid pressure in chamber 48 acts against the bottom surface of liner 56, tending to retain the liner 56 in its socket or cavity 50. Thus, double retaining means are available to maintain the liner 56 in place, these means being the rough surfaces of cavity 50 and the liquid pressure in chamber 48. With this particular liner arrangement, the liner becomes a definite cooperative part of the brake assembly.

The brake assembly is released by relieving the pressure in chamber 48 whereupon piston 44 and pressure plate 40 are forced to separate from backing plate 36 by means of return springs (not shown).

The brake of this invention, as explained above, is economical and reliable, and the method by which it is produced is simple, economical, and relatively expeditious.

Although only one embodiment of the invention has been illustrated and described, various changes in the form and relative arrangements of the parts may be made to suit requirements.

I claim:
1. An annular supporting member adapted for use with a friction brake mechanism, said member including a semi-annular rough cavity provided with a bottom portion, a plastic liner intimately fitted to the walls of said cavity and providing a semi-annular chamber, the rough contour of the walls of said cavity tending to secure said liner in place, and a piston reciprocably received in said chamber, said chamber and said piston having uniform radial dimensions throughout their arcuate lengths.

2. In a disc brake mechanism, an annular supporting member comprising a rough cavity provided with a bottom portion, a liner composed of a plastic material intimately fitted to the walls of said cavity and providing a chamber having smooth sides, the intimate contact between the rough cavity walls and the liner providing the means for securing said liner in place, and a piston reciprocably received in said chamber.

3. An annular supporting member adaptive for use in a disc brake mechanism, said member including a rough cavity rectangular in sectional outline, a plastic liner intimately fitted to the walls of said cavity and providing a power fluid receiving chamber, the rough contour of the walls of said cavity tending to secure said liner in place, and a motor piston reciprocably received in said chamber, said chamber and said piston having substantially uniform radial dimensions throughout their arcuate lengths.

4. In a circular disc brake, an annular supporting member, an arcuate cavity formed in said supporting member and being provided with roughened walls, a liner composed of plastic material anchored to the roughened walls of said cavity and providing a chamber having smooth sides, said sides being located throughout their actual length at a predetermined radial distance from the center of said supporting member, said liner being secured in place by intimate contact between the rough cavity walls and the liner, and a piston reciprocably received in said chamber and subjected to fluid pressure, said fluid also bearing against the bottom of said liner tending to solidly retain said liner in the cavity.

5. In a disc brake including an annular supporting member having a semi-annular cavity concentrically formed therein, said cavity having a bottom and roughened walls, a liner formed of plastic material intimately fitted with said bottom and walls, a piston reciprocably received in said chamber and subjected to fluid pressure, said fluid also bearing against the bottom of said liner tending to solidly retain said liner in the cavity.

References Cited in the file of this patent

UNITED STATES PATENTS

| | | |
|---|---|---|
| 1,584,413 | Warner | May 11, 1926 |
| 1,621,858 | Sherwood | Mar. 22, 1927 |
| 1,919,455 | Wilson | July 25, 1933 |
| 2,132,978 | Stewart | Oct. 11, 1938 |
| 2,279,671 | Ford | Apr. 14, 1942 |
| 2,304,589 | Nickerson | Dec. 8, 1942 |
| 2,407,559 | Krotz | Sept. 10, 1946 |
| 2,423,881 | DuBois | July 15, 1947 |

FOREIGN PATENTS

| | | |
|---|---|---|
| 113,084 | Sweden | Jan. 30, 1945 |